US007461014B2

(12) United States Patent
Halcrow et al.

(10) Patent No.: US 7,461,014 B2
(45) Date of Patent: Dec. 2, 2008

(54) METHOD AND APPARATUS FOR BIDDING ON BROADCAST SERVICE REQUESTS AND OFFERS FROM NEARBY DEVICES

(75) Inventors: Michael Austin Halcrow, Pflugerville, TX (US); Dustin C. Kirkland, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/014,058

(22) Filed: Dec. 16, 2004

(65) Prior Publication Data

US 2006/0136319 A1    Jun. 22, 2006

(51) Int. Cl.
*G06Q 30/00*    (2006.01)
(52) U.S. Cl. ...................................................... 705/26
(58) Field of Classification Search ................ 705/26, 705/27, 37
See application file for complete search history.

(56) References Cited

U.S. PATENT DOCUMENTS

| | | | |
|---|---|---|---|
| 2001/0049636 A1* | 12/2001 | Hudda et al. ................. | 705/26 |
| 2002/0065713 A1  | 5/2002  | Awada et al. | |
| 2002/0161697 A1* | 10/2002 | Stephens et al. ............. | 705/37 |
| 2002/0174025 A1  | 11/2002 | Hind et al. | |
| 2003/0041014 A1  | 2/2003  | Grey et al. ................... | 705/37 |
| 2003/0065805 A1* | 4/2003  | Barnes, Jr. ................... | 709/231 |
| 2004/0076279 A1  | 4/2004  | Taschereau ............ | 379/218.01 |
| 2004/0117195 A1* | 6/2004  | Bodin ............................ | 705/1 |
| 2005/0149410 A1* | 7/2005  | Livesay ....................... | 705/26 |

FOREIGN PATENT DOCUMENTS

WO    WO 01/26393    4/2001

OTHER PUBLICATIONS

SmartServ to Provide Wireless Auction Solution for Bidz.com, PR Newswire. New York: May 17, 2002. p. 1 http://proquest.umi.com/pqdweb?did=120119464&sid=2&Fmt=3&cli entId=19649 &RQT=309&VName=PQD.*
Li et al., "Design and Implementation of Location-Based Wireless Targeted Advertising", http://spie.org/scripts/abstract.pl?bibcode=2001SPIE%2e4586%2e%2e291, Aug. 20, 2004, pp. 1-2.

(Continued)

*Primary Examiner*—Jeffrey A. Smith
*Assistant Examiner*—Mila Airapetian
(74) *Attorney, Agent, or Firm*—Duke W. Yee; Jeffrey S. LaBaw; Gerald H. Glanzman

(57) ABSTRACT

An improved method, apparatus, and computer instructions in a portable device for obtaining bids for a task. Access to a task in a set of tasks for bidding is provided through a wireless network. The access to the task includes a specification of a selected distance between a bidding entity and a location of the portable device that the bidding entity is required to be located within for generating bids. A bid for the task is received from an entity through the wireless network if the entity is within a selected distance of a location of the portable device. The bid may be accepted for completing the task.

11 Claims, 5 Drawing Sheets

OTHER PUBLICATIONS

Kowalczyk et al., "Integrating Mobile and Intelligent Agents in Advanced e-Commerce: A Survey", Agent Technologies, Infrastructure, Tools, and Applications for E-Services Node 2002, Agent Related Workshops, Efurt, Germany, Oct. 7-10, 2002, published by Sprinter in Lecture Notes on Computer Science, 2592 Springer 2003, ISBN 3-540-00742, pp. 1-17.

Data Privacy, Before the Federal Communications Commission, Washington, D.C. 20554, WT Docket No. 01-72, DA-01-696, pp. 1-19.

Hristova et al., "Ad-me: Wireless Advertising Adapted to the User Location, Device and Emotions", 37th Hawaii International Conference on System Sciences, Jan. 5-8, 2004, 10 pages.

Li et al., "Design and Implementation of Location-Based Wireless Targeted Advertising", Wireless and Mobile Communications: APOC 2001, Asia-Pacific Optical and Wireless Communications, (Proceedings of SPIE Conference, Beijing, Nov. 12-15, 2001, vol. 4586, pp. 291-297).

* cited by examiner

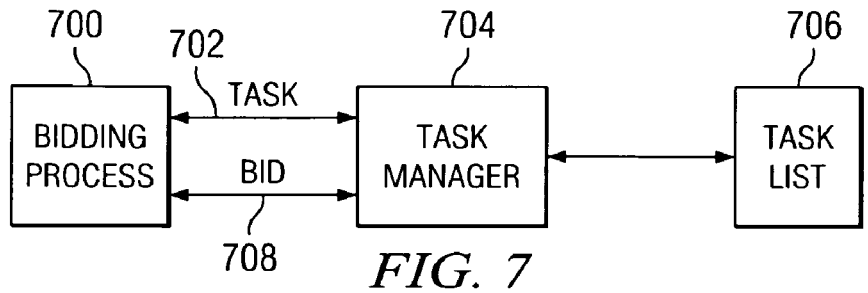
FIG. 7
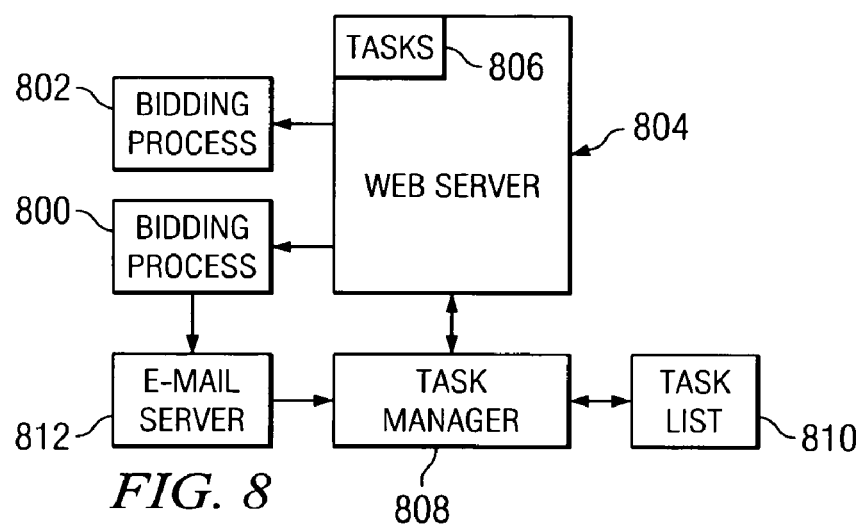
FIG. 8
| USER ID | TASK | LOCATION | DISTANCE |
|---------|------|----------|----------|
| PDA 1 | FLOWERS | X LATITUDE Y LONGITUDE | 1 MILE |
| CELL 2 | CAR WASH | X LATITUDE Y LONGITUDE | 1 MILE |
FIG. 9

METHOD AND APPARATUS FOR BIDDING ON BROADCAST SERVICE REQUESTS AND OFFERS FROM NEARBY DEVICES

BACKGROUND OF THE INVENTION

1. Technical Field

The present invention relates generally to an improved data processing system and in particular, to a method, apparatus, and computer instructions for processing data. Still more particularly, the present invention relates an improved method, apparatus, and computer instructions for bidding on requests from devices.

2. Description of Related Art

Personal digital assistants (PDAs) are becoming more commonplace. A PDA is a handheld computer that serves as an organizer for personal information. PDAs provide many organizational features, such as a calendar, an address book, a calculator, a memo or notepad, and a task manager. Features from PDAs may be combined with other devices, such cell phones and with other wireless technologies to provide a mobile office for people on the go.

Additionally, many PDAs are Web enabled. In other words, these devices are able access the World Wide Web ("Web") in a fashion similar to desktop and laptop computers. Further, wireless technologies allow PDAs to access this information from any location in which wireless access is provided for users. With this feature, users may obtain telephone numbers, addresses, and directions for people and businesses using Web-based white or yellow pages from their PDAs. For example, if a user is looking for a gas station, the user may lookup this information and obtain directions to the gas station by looking up this information using a Web-based yellow pages. Further, the ability to find businesses offering items, such as goods or services is particularly useful to a user completing tasks in a task manager. A user may find several businesses that offer the service or item that the user needs to complete a task. In doing so, the user may visit or call these businesses to see what offers or specials that may be present. Also, the user may wish to use a business that is close by to the location of the user. A Website providing directions may be used to find out how far away different businesses are located. Although the ability to find these businesses is useful, checking out each business is often time-consuming.

It would be advantageous to have an improved method, apparatus, and computer instructions for completing tasks in which offers or requests for items are made through Web enabled portable devices.

SUMMARY OF THE INVENTION

The present invention provides an improved method, apparatus, and computer instructions in a portable device for obtaining bids for a task. Access to a task in a set of tasks for bidding is provided through a wireless network. The access to the task includes a specification of a selected distance between a bidding entity and a location of the portable device that the bidding entity is required to be located within for generating bids. A bid for the task is received from an entity through the wireless network if the entity is within a selected distance of a location of the portable device. The bid may be accepted for completing the task.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating components used in bidding on broadcasted requests in accordance with a preferred embodiment of the present invention;

FIG. 8 is a diagram illustrating components used to bid on requests in accordance with a preferred embodiment of the present invention;

FIG. 9 is a diagram of tasks in accordance with a preferred embodiment of the present invention;

DETAILED DESCRIPTION OF THE PREFERRED EMBODIMENT

Figure 1:
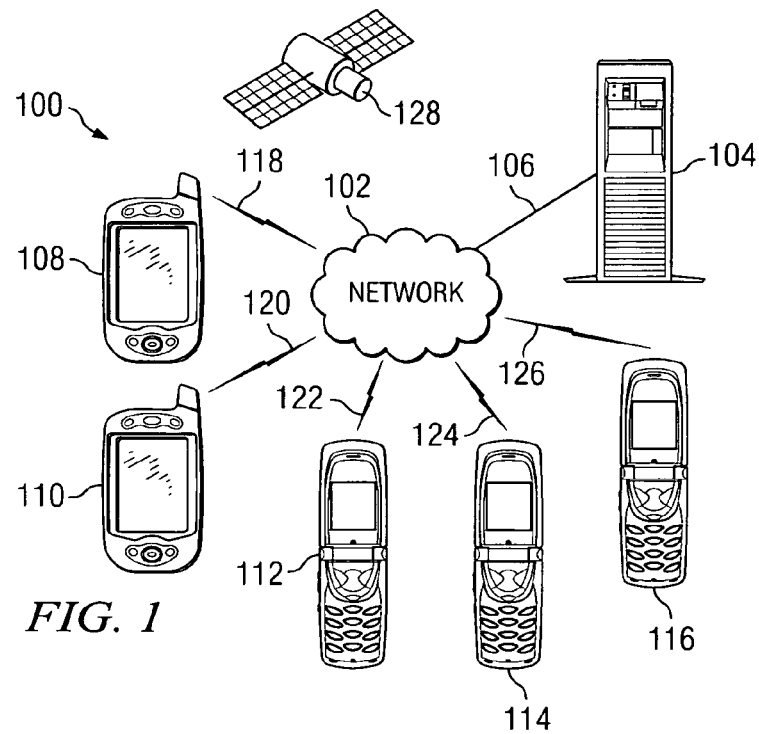
FIG. 1 is a diagram illustrating a network data processing system in accordance with a preferred embodiment of the present invention.

With reference to the figures, and in particular FIG. 1, a diagram illustrating a network data processing system is depicted in accordance with a preferred embodiment of the present invention. Network data processing system 100 includes network 102, which is the medium used to provide communications links between various devices and computers connected together within network data processing system 100. Network 102 may include connections, such as wire, wireless communication links, or fiber optic cables.

Server 104 is connected to network 102 through communications link 106. In the depicted example, server 104 provides data, such as boot files, operating system images, and applications to clients, such as PDA 108, PDA 110, mobile phone 112, mobile phone 114, and mobile phone 116. These clients are mobile or portable devices connected to network 102 through wireless communications links 118, 120, 122, 124, and 126. Through these wireless communications links, the clients are able to access information from server 104, such as Web sites or databases. These wireless communications links may be established using various radio frequency systems. For example, 802.11 is a family of IEEE standards for wireless local area networks. This set of standards is designed to extend Ethernet into the wireless domain.

Another standard that may be used for these communications links is Bluetooth, which is a wireless personal area network (PAN) technology from the Bluetooth Special Interest Group. Bluetooth is an open standard for short-range transmission of digital voice and data between mobile devices (laptops, PDAs, phones) and desktop devices. This standard supports point-to-point and multipoint applications.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Additionally, clients 108, 110, 112, 114, and 116 also include global positioning system (GPS) capabilities that allow these clients to be aware of their location through information received from a global positioning system 128. A global positioning system is a worldwide satellite navigational system formed by satellites orbiting the earth and their corresponding receivers on the earth. The global positioning system satellites continuously transmit digital radio signals that contain data on the satellite location and the exact time to the earth-bound receivers, such as clients 108, 110, 112, 114, and 116.

Based on this information the receivers know how long it takes for the signal to reach the receiver on earth. As each signal travels, the longer it takes the receiver to get the signal, the farther away the satellite is. By knowing how far away a satellite is, the receiver knows that it is located somewhere on the surface of an imaginary sphere centered at the satellite. By using three satellites, a global positioning system can calculate the longitude and latitude of the receiver based on where the three spheres intersect. By using four satellites, a global positioning system can also determine altitude.

The present invention recognizes that requests based from tasks may be broadcast by devices to obtain bids or offers from vendors or businesses, performing a service or selling an item for a task. Often, a user may desire to receive bids from businesses that are close by to the location of the user. The user may set a preference for how close a business should be located. In one illustrative example, requests are sent and bids are received when the user carrying the device enter the range of a wireless network for a particular business. Alternatively, the location of the user may be established by a global positioning system unit located in the device.

Figure 2:
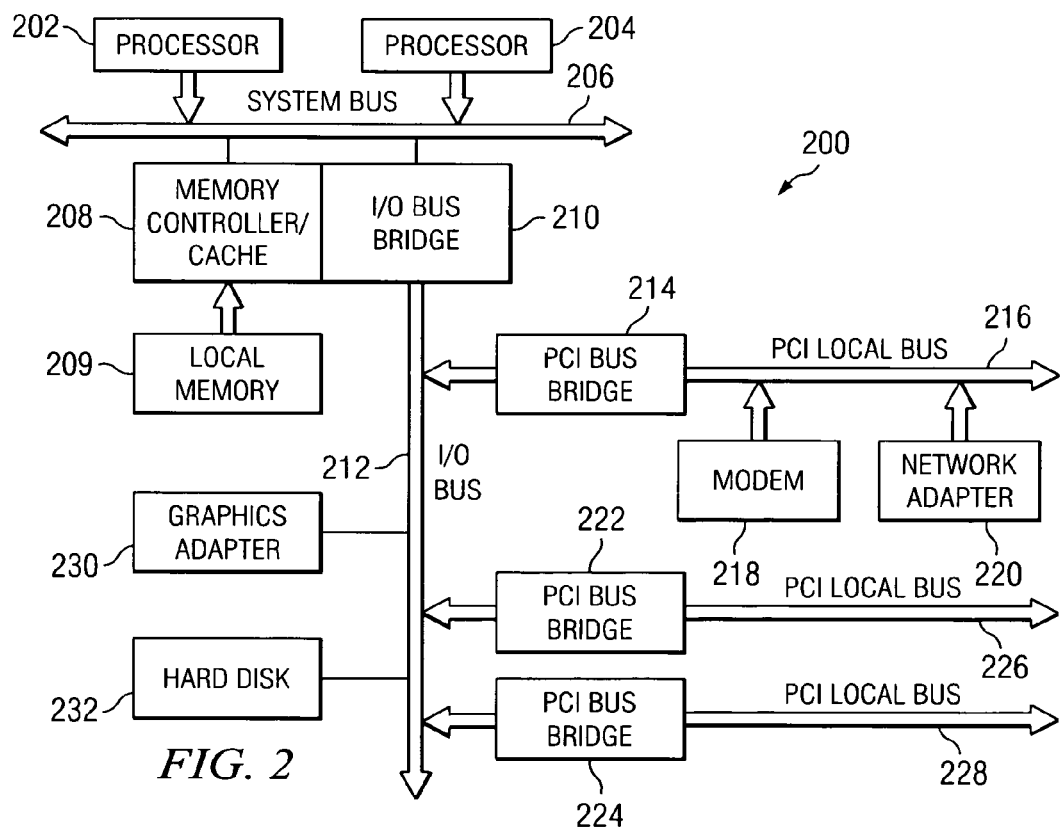
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
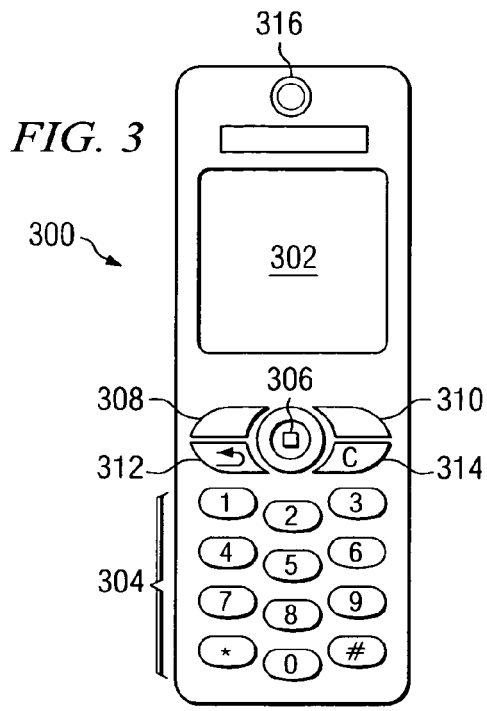
FIG. 3 is a diagram of a mobile telephone in accordance with a preferred embodiment of the present invention.

With reference now to FIG. 3, a diagram of a mobile telephone is depicted in accordance with a preferred embodiment of the present invention. Mobile phone 300 is an example of a portable data processing system in which the present invention may be implemented. Mobile phone 300 includes screen 302, which is capable of displaying pictures and text. Additionally, mobile phone 300 also includes numeric keypad 304, joystick 306, and buttons 308, 310, 312, and 314 placed around the joystick 306. These buttons are used to initiate various functions in mobile phone 300. These functions include, for example, activating a menu, displaying a calendar, or initiating a call. Mobile phone 300 also includes camera 316, which may be used to take pictures or videos depending on the implementation.

Figure 4:
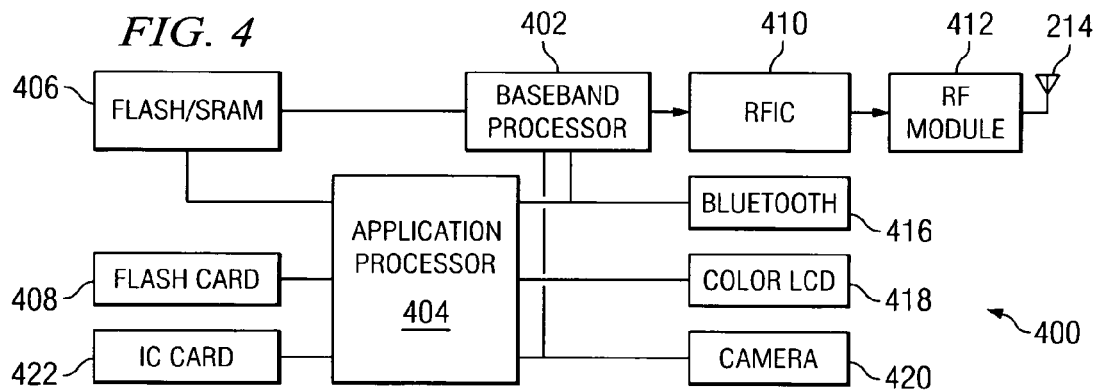
FIG. 4 is a block diagram of a camera phone in accordance with a preferred embodiment of the present invention.

Turning next to FIG. 4, a block diagram of a camera phone is depicted in accordance with a preferred embodiment of the present invention. Camera phone 400 includes baseband processor 402, application processor 404, flash/static random access memory (SRAM) 406, flash card 408, radio frequency integrated circuit (RFIC) 410, radio frequency (RF) module 412, antenna 414, Bluetooth unit 416, color liquid crystal display (LCD) 418, camera 420, and IC card 422.

Baseband processor 402 provides for receiver and transmitter operations and is also referred to as a transceiver. In particular, baseband processor 402 handles all of the audio, signal, and data processing needed to receive and send data using RF transmissions or Bluetooth transmissions. Application processor 404 provides the processing power for other functions within camera phone 400. For example, calculators, calendars, alarms, camera functions, and directories are provided through application processor 404. Flash/SRAM 406 is a storage device in which various instructions for providing the functions within camera phone 400 are located and provide upgrades. Flash card 408 is a storage device in which user data and applications may be stored. An example of flash card 408 is a secure digital card.

A pathway for the transmission of voice and other types of data is through RFIC 410. Additionally, short range transmissions may be sent or received through Bluetooth unit 416. Bluetooth unit 416 conforms to Bluetooth wireless specification, which defines the link layer and application layer for product developers. Both of these transmissions are made through antenna 414 in this illustrative example.

Color LCD 418 provides a display for pictures and other data for camera phone 400. Camera 420, in this example, is a complementary metal oxide semiconductor (CMOS) camera, which may be built into camera phone 400 or connected to camera phone 400 as a module, such as IC card 422. IC card 422 also may contain other application specific functions, such as a global positioning system or other functions, such as a modem or additional memory. Camera 420 forms the camera module of camera phone 400, while the other components form the digital phone module of camera phone 400 in these illustrative examples.

Figure 5:
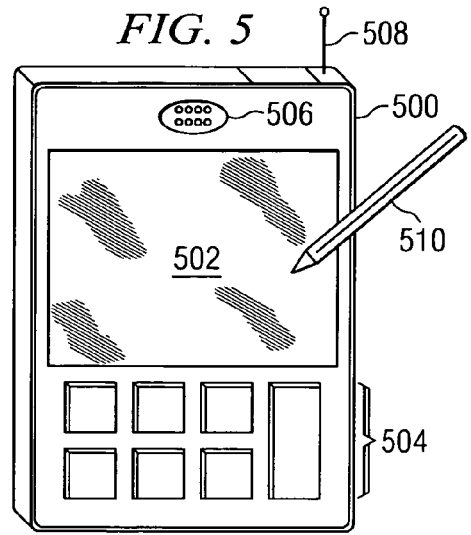
FIG. 5 is a diagram of a client in the form of a personal digital assistant (PDA) in accordance with a preferred embodiment of the present invention.

With reference now to FIG. 5, a diagram of a client in the form of a personal digital assistant (PDA) is depicted in accordance with a preferred embodiment of the present invention. PDA 500 is an example of a portable data processing system in which the present invention may be implemented. PDA 500 includes a display 502 for presenting textual and graphical information. Display 502 may be a known display device, such as a liquid crystal display (LCD) device. The display may be used to present a map or directions, calendar information, a telephone directory, or an electronic mail message. In these examples, screen 502 may receive user input using an input device such as, for example, stylus 510.

PDA 500 may also include keypad 504, speaker 506, and antenna 508. Keypad 504 may be used to receive user input in addition to using screen 502. Speaker 506 provides a mechanism for audio output, such as presentation of an audio file. Antenna 508 provides a mechanism used in establishing a wireless communications link between PDA 500 and a network, such as network 202 in FIG. 2.

PDA 500 also preferably includes a graphical user interface that may be implemented by means of systems software residing in computer readable media in operation within PDA 500.

Figure 6:
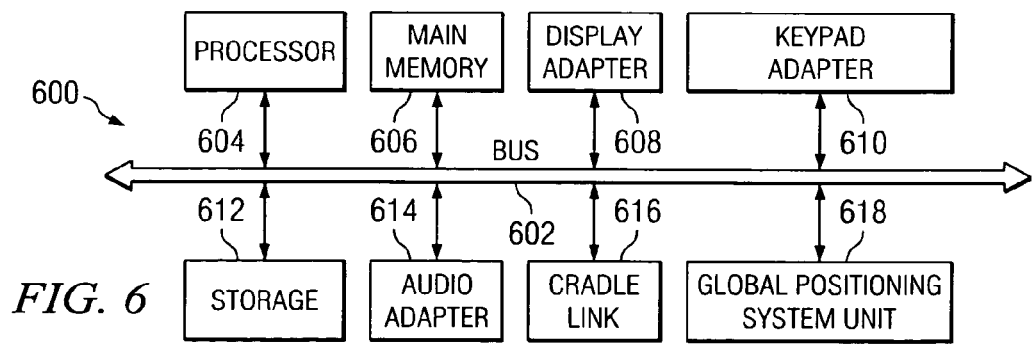
FIG. 6 is a block diagram of a PDA in accordance with a preferred embodiment of the present invention.

Turning now to FIG. 6, a block diagram of a PDA is shown in accordance with a preferred embodiment of the present invention. PDA 600 is an example of a PDA, such as PDA 500 in FIG. 5, in which code or instructions implementing the processes of the present invention may be located. PDA 600 includes a bus 602 to which processor 604 and main memory 606 are connected. Display adapter 608, keypad adapter 610, storage 612, and audio adapter 614 also are connected to bus 602. Cradle link 616 provides a mechanism to connect PDA 600 to a cradle used in synchronizing data in PDA 600 with another data processing system. Further, display adapter 608 also includes a mechanism to receive user input from a stylus when a touch screen display is employed.

An operating system runs on processor 604 and is used to coordinate and provide control of various components within PDA 600 in FIG. 6. The operating system may be, for example, a commercially available operating system such as Windows CE, which is available from Microsoft Corporation. Instructions for the operating system and applications or programs are located on storage devices, such as storage 612, and may be loaded into main memory 606 for execution by processor 604. PDA 600 also includes global positioning system unit 618. This unit is employed to provide location information for PDA 600.

Those of ordinary skill in the art will appreciate that the hardware in FIG. 6 may vary depending on the implementation. Other internal hardware or peripheral devices, such as flash ROM (or equivalent nonvolatile memory) or optical disk drives and the like, may be used in addition to or in place of the hardware depicted in FIG. 6.

Turning next to FIG. 7, a diagram illustrating components used in bidding on broadcasted requests is depicted in accordance with a preferred embodiment of the present invention. In this example, bidding process 700 may access or receive task 702 from task manager 704. Bidding process 700 may be located on a data processing system for a vendor or business. This data processing system may be implemented using data processing system 200 in FIG. 2. Task manager 704 may be located in a portable device such as camera phone 400 in FIG. 4 or PDA 600 in FIG. 6.

Task 702 is a task from task list 706 managed through task manager 704. Task 702 may be broadcast by task manager 704 to bidding process 700 through a wireless network. In response to receiving this broadcasted task, bidding process 700 determines whether the task contains an item offered by the business. In these examples, an item may be goods or services. For example, the business may be a florist. If the task is for the purchase of a plant or a floral arrangement, a bid or offer to provide the item in the task may be made to complete this task. In this case, bidding process 700 returns bid 708 to task manager 704. Bid 708 may be accepted or rejected by the user.

On the other hand, if the task is for a car wash, bidding process 700 ignores task 702 because the item is not a service offered by the business. This process may be repeated for each task on task list 706.

With reference to FIG. 8, a diagram illustrating components used to bid on requests is depicted in accordance with a preferred embodiment of the present invention. In these examples, bidding process 800 and bidding process 802 are located in data processing systems, such as data processing system 200 in FIG. 2. These processes may access Web server 804 to identify tasks 806. These tasks are ones for which users have requested bids to complete these tasks.

Tasks 806 may be received from task manager 808, which is located in a device such as camera phone 400 in FIG. 4. In this example, tasks 806 originate from task list 810. Tasks 806 may include tasks from other tasks list in other devices. In this example, task Manager 808 broadcasts tasks to Web server 804, rather than sending the tasks directly to a bidding process, such as shown in FIG. 7.

Bidding process 800 and bidding process 802 may be found in various locations. In some cases, a bidding process may be farther away than desired by a user. For example, a business for bidding process 800 may be located within one mile of a device in which task manager 808 is located while bidding process 802 may be located ten miles away from task manager 808. Web server 804 examines each task in tasks 806 and identifies businesses to sent the task for bidding. Based on the distance specified for the task, Web server 804 selectively sends task to bidding process 800 and bidding process 802. Further, Web server 804 may match up items in the task to select which business tasks are sent to for bidding.

In this example, bidding process 802 does not receive task from Web server 804 for bidding tasks, while bidding process 800 receives tasks from Web server 804. In response, bidding process 800 generates bids depending on the particular type of items present in tasks 806. In this example, the bid is sent by bidding process 800 as a reply or e-mail message to e-mail server 812. This reply e-mail message is then sent to task manager 808 for presentation to the user.

In FIG. 9, a diagram of tasks is depicted in accordance with a preferred embodiment of the present invention. Tasks 900 contains entries 902 and 904. Tasks 900 is an example of tasks 806 in FIG. 8. Each entry includes a user identifier, a task, a location, and a distance. The user ID is used to identify the device from which the task originated. The task identifies the particular assignment or job to be performed. The location identifies the current location of the task manager. In these examples, the location is in terms of latitude and longitude. The distance in each entry is the farthest distance that the vendor or business should be located from the device for the task to be subject to a bid.

Figure 10:
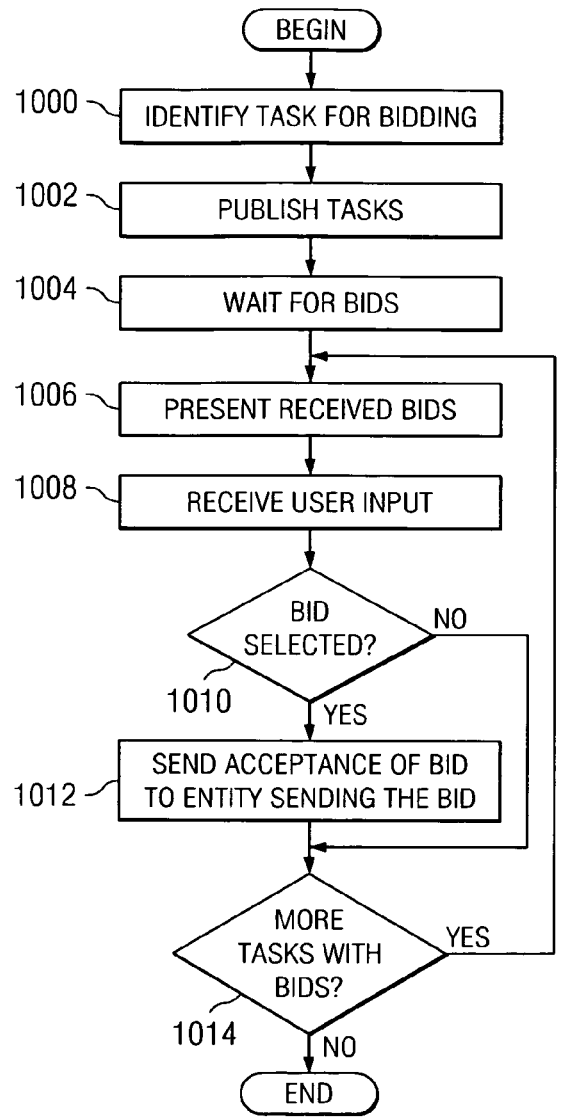
FIG. 10 is a flowchart of a process for bidding on tasks in accordance with a preferred embodiment of the present invention.

Turning next to FIG. 10, a flowchart of a process for bidding on tasks is depicted in accordance with a preferred embodiment of the present invention. The process illustrated in FIG. 10 may be implemented in a task manager such as task manager 704 in FIG. 7.

The process begins by identifying one or more tasks for bidding (step 1000). In step 1000, the user may select tasks for which bidding is desired. Alternatively, all of the tasks in a task list may be selected in step 1000. These tasks are published (step 1002). The tasks are published by broadcasting them onto a wireless network. These tasks may be directly received by a business through its wireless network or sent to a Web server or other server for access by businesses desiring to bid on tasks.

The process then waits to receive bids for the published tasks (step 1004). In the illustrative examples, the bids are received from businesses that are within a selected distance of the portable device. In this manner a user may specify how far the user is willing to travel to purchase an item to complete a task. Bids are not received from businesses outside of this maximum distance that the user is willing to travel. When bids are received, these received bids are presented to the user (step 1006). In these examples, these bids are displayed on the display screen of the portable device. The process receives the user input (step 1008). A determination is made as to whether a bid has been selected (step 1010). If a bid has been selected for acceptance, the acceptance of the bid is sent to the entity sending the bid (step 1012). A determination is then made as to whether there are more tasks with bids (step 1014). If tasks with bids are present, the process returns to step 1006 to present the new bids to the user.

With reference again to step 1014, if there are no tasks with bids present the process terminates. Turning back to step 1010, if no bid is selected by the user, the process turns to step 1014 to determine whether there are more tasks with bids present.

Figure 11:
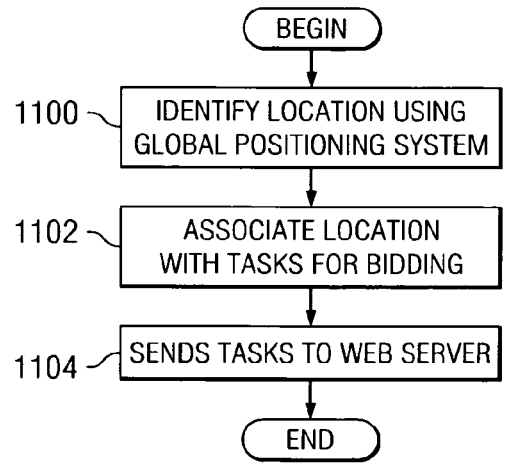
FIG. 11 is a flowchart of a process for generating location information for use in bidding in accordance with a preferred embodiment of the present invention.

Turning next to FIG. 11, a flowchart of a process for generating location information for use in bidding is depicted in accordance with a preferred embodiment of the present invention. The process illustrated in FIG. 11 may be implemented in a task manager such as task manager 704 in FIG. 7.

The process begins by identifying a location by using a global positioning system unit located in the portable device in which the task manager is located (step 1100). The location is associated with the tasks for bidding (step 1102). Next, the tasks are sent to a Web server (step 1104) with the process terminating thereafter. The tasks are sent to a Web server, such as Web server 804 in FIG. 8. This location information is used to determine whether a business offering services or items is located within a distance specified by the user to generate bids.

Figure 12:
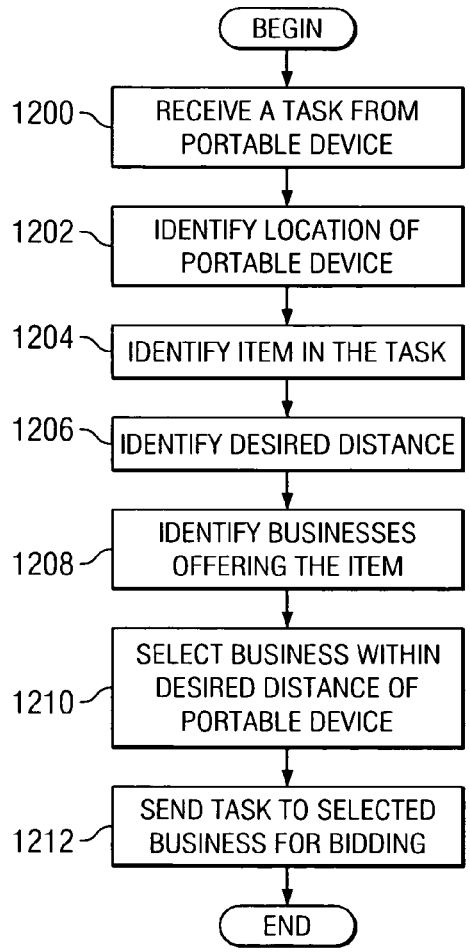
FIG. 12 is a flowchart of a process for handling tasks in a server in accordance with a preferred embodiment of the present invention.

In FIG. 12, a flowchart of a process for handling tasks in a server is depicted in accordance with a preferred embodiment of the present invention. The process illustrated in FIG. 12 may be implemented in a server such as Web server 804 in FIG. 8.

The process begins by receiving a task form a portable device (step 1200). This task may be received through a wireless network in which the portable device is located.

Entry 902 in FIG. 9 is an example of a task that may be received in step 1200. The location of the portable device is located (step 1202). Is this example, the location of the portable device is included in the task. The item for the task is identified (step 1204). Then, the desired distance is identified from the task (step 1206). In these examples, the desired distance is the maximum distance from which the portable device may be located with respect to a business bidding on the item in the task. This feature in these depicted examples, allows a user to specify how far the user is willing to travel to purchase an item and receive bids from those business or entities that are within the distance that the user is willing to travel.

Next, businesses offering the item are identified (step 1208). In this example, these businesses may be identified through businesses that have registered for this service in which tasks are forwarded or sent to qualified businesses for bidding. Additionally, businesses identified in step 1208 are selected such that the selected businesses are within a desired distance of the portable device (step 1210). The task is sent to the selected business for bidding (step 1212) with the process terminating thereafter.

Figure 13:
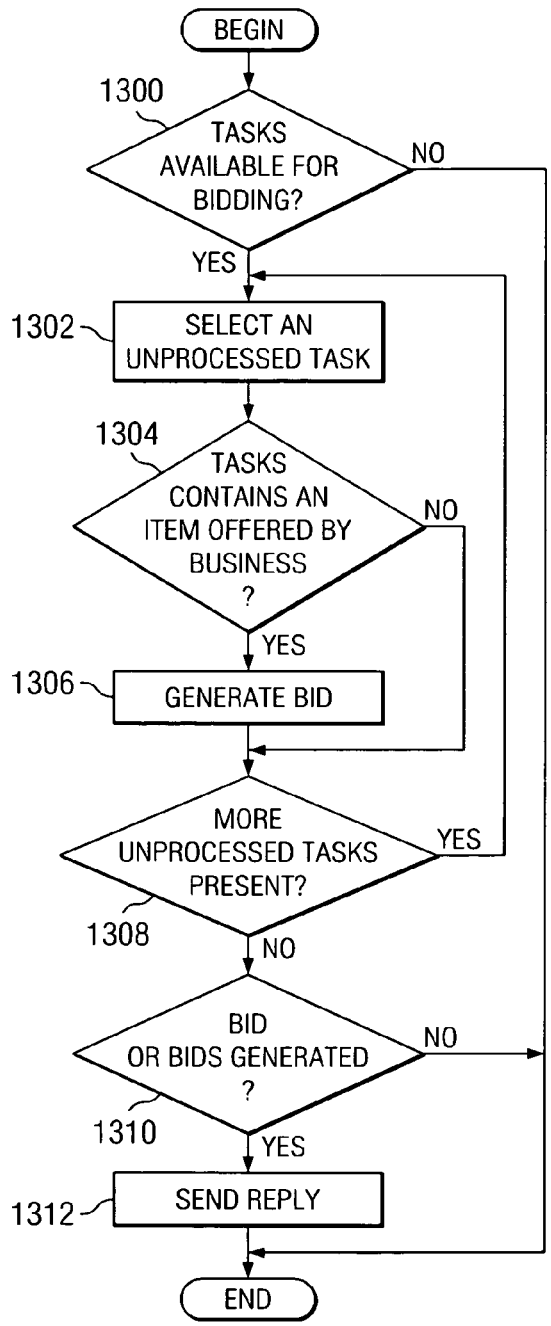
FIG. 13 is a flowchart of a process for bidding on tasks in accordance with a preferred embodiment of the present invention.

Turning next to FIG. 13, a flowchart of a process for bidding on tasks is depicted in accordance with a preferred embodiment of the present invention. The process illustrated in FIG. 13 may be implemented in a bidding process such as bidding process 700 in FIG. 7 or bidding process 800 in FIG. 8.

The process begins by making a determination as to whether tasks are available for bidding (step 1300). This step may be accomplished in a number of different ways. For example, step 1300 may be implemented by checking to see if the portable device has broadcast any tasks for bidding. This broadcasting may occur when the portable device moves within the wireless network of the business. Alternatively, in these examples, the portable device may move within a wireless network and provide bids to a server for access by a business bidding on tasks. In this case, if the bidding process occurs through a Web server, the Web server sends tasks to the bidding process for bidding. In either case, tasks may be present from multiple portable devices.

If tasks are available for bidding, an unprocessed task is selected for processing (step 1302). A determination is made as to whether the selected task contains an item offered by the business (step 1304). This item may be goods or services. For example, if the business is a hardware store and the task is to obtain a power saw, this task contains an item offered by the business. In this example, if the task is to purchase groceries, the task is not an item offered by the business. Additionally, if the task is received from a Web server that has transmitted the task based on items offered by the business, step 1304 may be skipped.

If the task is in a category handled by the business, a bid is generated (step 1306). Bids may be generated using a number of different mechanisms. For example, the item to be purchased may be compared with a pricing list to identify a price for the bid. Services and goods providers generally have lower bounds on prices such that they remain profitable. Such providers also have an idea of typical prices and typical supplies. The freedom to dynamically change prices allows businesses to flexibly coordinate supply and demand. In view of these assumptions, bids may be generated manually by a person, who receives incoming task lists and quotes explicit prices. Alternatively, in a preferred embodiment, a data processing system is used to generate bids automatically. A vendor who has a surplus of roses bids lower prices than normal. On the other hand, an auto detailing shop that is operating at 95 percent capacity might choose to bid a higher price than normal due to the increase in demand. Other businesses might bid very low on one item to simply get the customer to enter the store and perhaps make additional purchases.

Next, a determination is made as to whether additional unprocessed tasks are present for bidding (step 1308). If additional unprocessed tasks are present, the process returns to step 1302 to select another task for processing. Otherwise, a determination is made as to whether a bid or a set of bids have been generated (step 1310). If one or more bids have been generated, a reply is sent (step 1312) with the process terminating thereafter. This reply may take different forms, for example, the bid may be sent directly to the portable device through the wireless network. Alternatively, if the portable is not within the wireless network of the business generating the bid, the reply may be sent through other mechanisms, such as an e-mail message.

The process terminates without sending a reply if one or more bids have not been generated. The process also terminates form step 1300 if tasks are not available for bidding.

Thus, the present invention provides an improved method, apparatus, and computer instructions for processing service requests broadcast by portable devices. This mechanism allows a business to receive tasks containing items that are broadcast by portable device for bidding. In some case, the business only receives the bid if the business is located within some select distance from the portable device. A business examines a task broadcast or published by a portable device to determine whether the business will generate a bid to provide the item. This bid is received by the portable device and presented to the user. The user may accept or reject the bid.

The mechanism of the present invention also may work in reverse. The business may generate bids or offers and send them to portable devices located within some selected distance from the business.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the portable device may include a process to filter out bids from entities or businesses that are located farther away from the selected distance that the user desires to travel. The process may use the location of the business and the location of the portable device to determine if the bid has been received from a business within the selected distance for acceptable bids. Bids within the desired distance may be displayed while other bids not within the desired distance are discarded. In another example, tasks in the depicted examples are described as containing only a single item. In other embodiments, a task may contain multiple items. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for bidding on a task, the method comprising:
   detecting a task published by a portable device for bidding, wherein the detecting the task published by the portable device for bidding comprises:
   detecting a presence of the portable device in a wireless network for the data processing system;
   responsive to detecting the presence of the portable device, determining by the data processing system whether a task list for the portable device is accessible;
   accessing the task list to detect the task in the task list;
   determining whether the portable device is within a selected distance of a location;
   determining whether the task can be completed;
   generating a bid to complete the task if the portable device is within the selected distance of the location and the task can be completed; and
   sending the bid to the portable device.

2. The method of claim 1, wherein the sending step includes:
   sending at least one e-mail message from the entity containing the bid.

3. The method of claim 1, wherein the task is at least one of a purchase of an item and a purchase of a service.

4. The method of claim 1, wherein the wireless network is a Bluetooth network.

5. The method of claim 1, wherein the selected distance is selected by a user of the portable device.

6. The method of claim 1, wherein the specification of the selected distance is located in the task.

7. The method of claim 1, wherein the location is a location of an entity generating the bid.

8. The method of claim 1, wherein the detecting step includes:
   establishing a connection with a Web server; and
   identifying the task at the Web server.

9. The method of claim 8, wherein the task is associated with a location of the portable device and wherein the determining step includes:
   determining whether the task is of a type that can be completed; and
   determining whether the location of the portable device allows for completion of the task.

10. The method of claim 9, wherein the location of the portable device is determined using a global positioning system.

11. The method of claim 9, wherein the location of the portable device is approximated based on connectivity of the portable device with the wireless network.

* * * * *